United States Patent
Astrom

(10) Patent No.: US 8,902,724 B2
(45) Date of Patent: Dec. 2, 2014

(54) METHOD AND APPARATUS FOR CROSS-TALK CANCELLATION

(75) Inventor: Magnus Astrom, Lund (SE)

(73) Assignee: Cambridge Silicon Radio Limited, Cambridge (GB)

( * ) Notice: Subject to any disclaimer, the term of this patent is extended or adjusted under 35 U.S.C. 154(b) by 833 days.

(21) Appl. No.: 12/863,138

(22) PCT Filed: Jan. 16, 2009

(86) PCT No.: PCT/GB2009/000125
§ 371 (c)(1),
(2), (4) Date: Jul. 15, 2010

(87) PCT Pub. No.: WO2009/090400
PCT Pub. Date: Jul. 23, 2009

(65) Prior Publication Data
US 2010/0309774 A1 Dec. 9, 2010

(30) Foreign Application Priority Data
Jan. 17, 2008 (GB) .................................. 0800891.4

(51) Int. Cl.
H04J 1/12 (2006.01)
H04B 1/52 (2006.01)
(52) U.S. Cl.
CPC ....................................... *H04B 1/525* (2013.01)
USPC ........................................................ 370/201
(58) Field of Classification Search
USPC ........... 370/201, 268, 286; 455/63.1, 73, 295; 379/417
See application file for complete search history.

(56) References Cited

U.S. PATENT DOCUMENTS

| 5,444,864 | A | 8/1995 | Smith | |
| 6,584,159 | B1 * | 6/2003 | Azadet et al. | 375/285 |
| 6,829,314 | B1 | 12/2004 | Zortea et al. | |
| 6,965,578 | B1 * | 11/2005 | Kappes | 370/286 |

(Continued)

FOREIGN PATENT DOCUMENTS

| FR | 2898746 A1 | 9/2007 |
| WO | 96/15596 A1 | 5/1996 |

OTHER PUBLICATIONS

DC offset and IM2 removal in direct conversion receivers, M Faulkner, IEEE Proc. Commun. vol. 149, No. 3, Jun. 2002, see whole document. esp. p. 180 (6 pgs).

*Primary Examiner* — Warner Wong
(74) *Attorney, Agent, or Firm* — RatnerPrestia

(57) ABSTRACT

The present invention addresses the problem of a second (or higher) order representation of a transmit signal which is transmitted by a transceiver being mixed into the region of the frequency spectrum of interest to the transceiver receiver, such that it can not then be spectrally filtered out. At its most straightforward, in one embodiment of the invention this is achieved by providing a cross-talk cancellation unit which takes the transmit signal, and obtains the second (or higher) order representation thereof. This representation is then subtracted from the received signal before the signal is passed to the radio control receiver signal processing elements. However, in a more preferred arrangement a filter is also provided, to filter the second or higher order version of the transmit signal, prior to its being subtracted from the received signal. The filter basically takes out the effects of any other filtering or processing which has happened to the transmit signal in the receiver signal chain. This would be, for example, the filtering effects provided by the anti-aliasing filter in the receiver.

24 Claims, 11 Drawing Sheets

(56) References Cited

U.S. PATENT DOCUMENTS

| | | | |
|---|---|---|---|
| 7,142,595 B1* | 11/2006 | Duvaut et al. | 375/232 |
| 7,580,683 B2* | 8/2009 | Gardenfors et al. | 455/73 |
| 7,590,077 B2* | 9/2009 | Shida | 370/286 |
| 7,626,916 B2* | 12/2009 | Kim et al. | 370/201 |
| 8,184,802 B1* | 5/2012 | Xiaopeng et al. | 379/406.06 |
| 2004/0052221 A1* | 3/2004 | Lai | 370/286 |
| 2004/0106381 A1 | 6/2004 | Tiller | |
| 2004/0170230 A1* | 9/2004 | Zimmerman et al. | 375/285 |
| 2004/0213354 A1* | 10/2004 | Jones et al. | 375/285 |
| 2006/0002720 A1* | 1/2006 | Nishiyama | 398/202 |
| 2006/0062166 A1* | 3/2006 | Jones et al. | 370/289 |
| 2007/0127356 A1* | 6/2007 | Bhukania et al. | 370/201 |
| 2007/0133815 A1* | 6/2007 | Cheong et al. | 381/71.1 |
| 2007/0184782 A1* | 8/2007 | Sahota et al. | 455/63.1 |
| 2007/0258514 A1* | 11/2007 | Wajcer et al. | 375/222 |

* cited by examiner

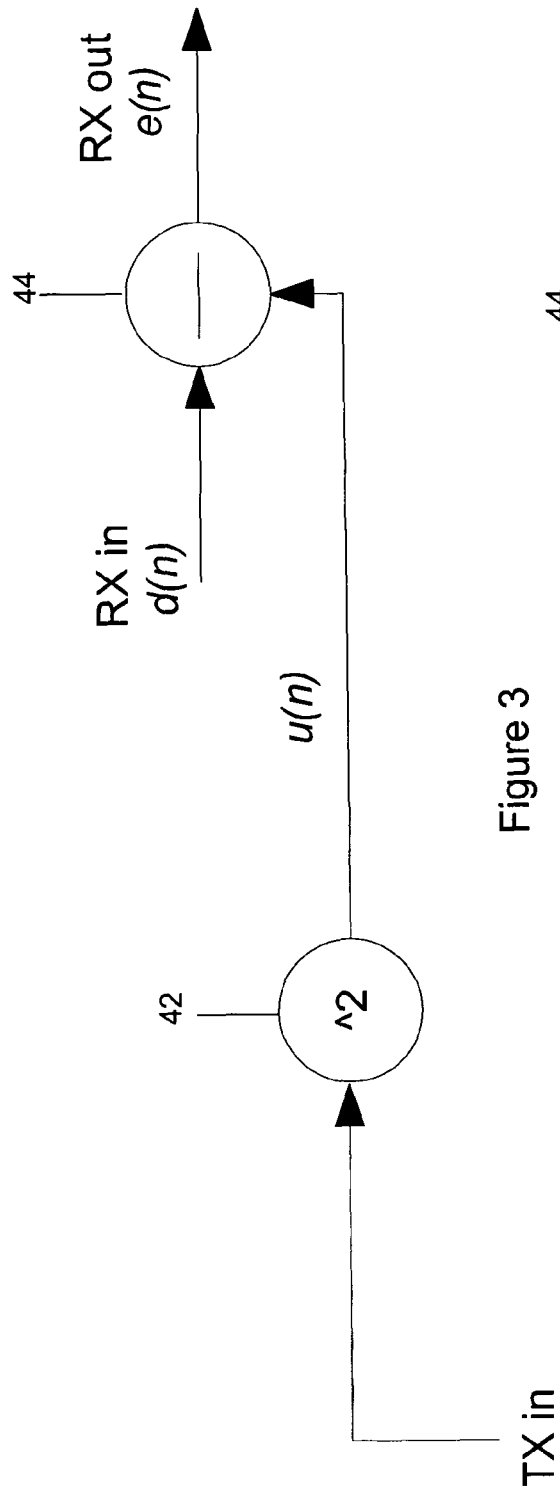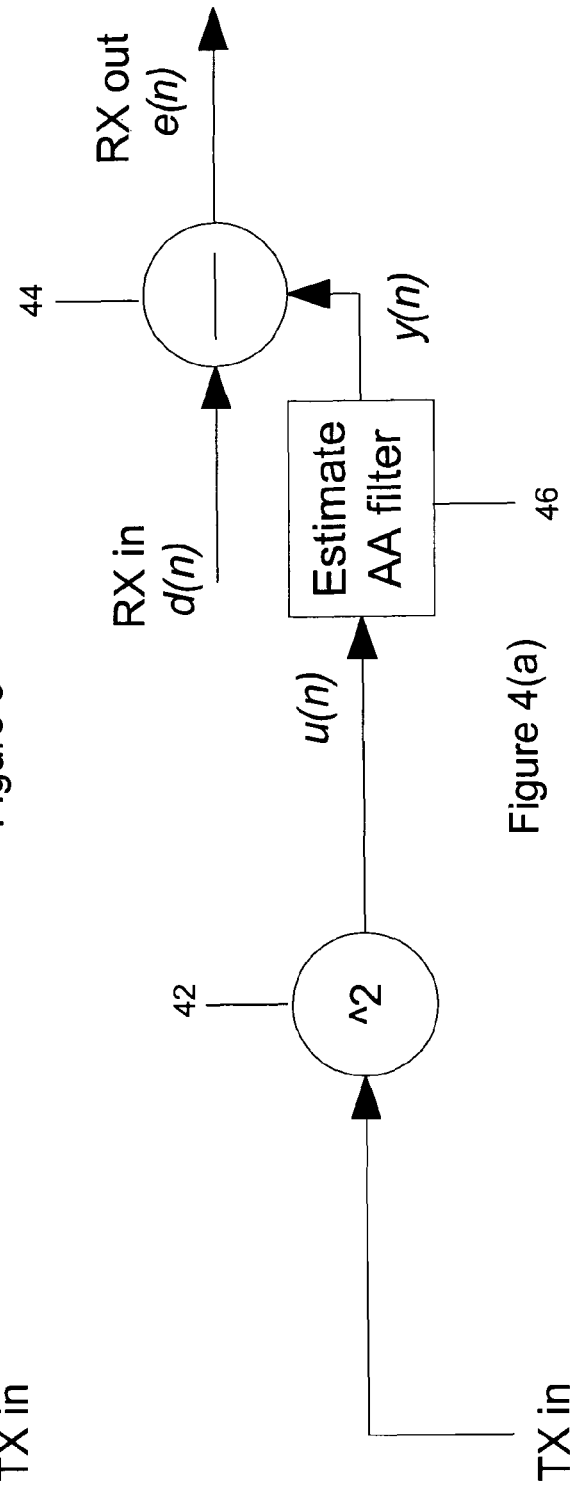

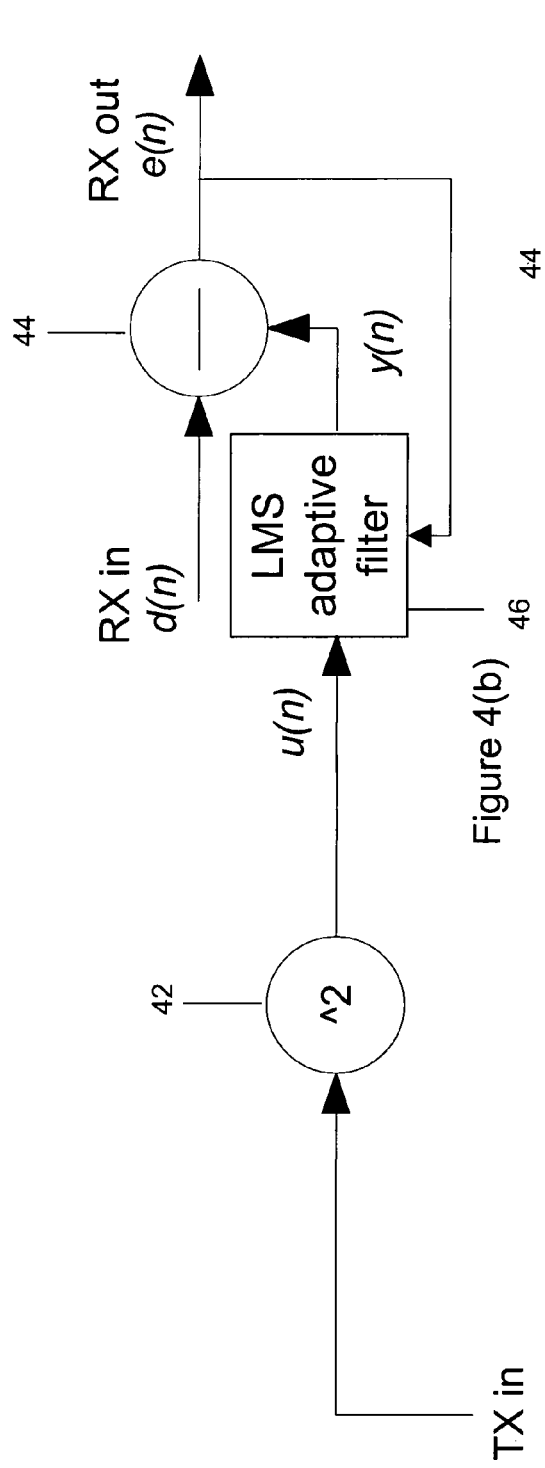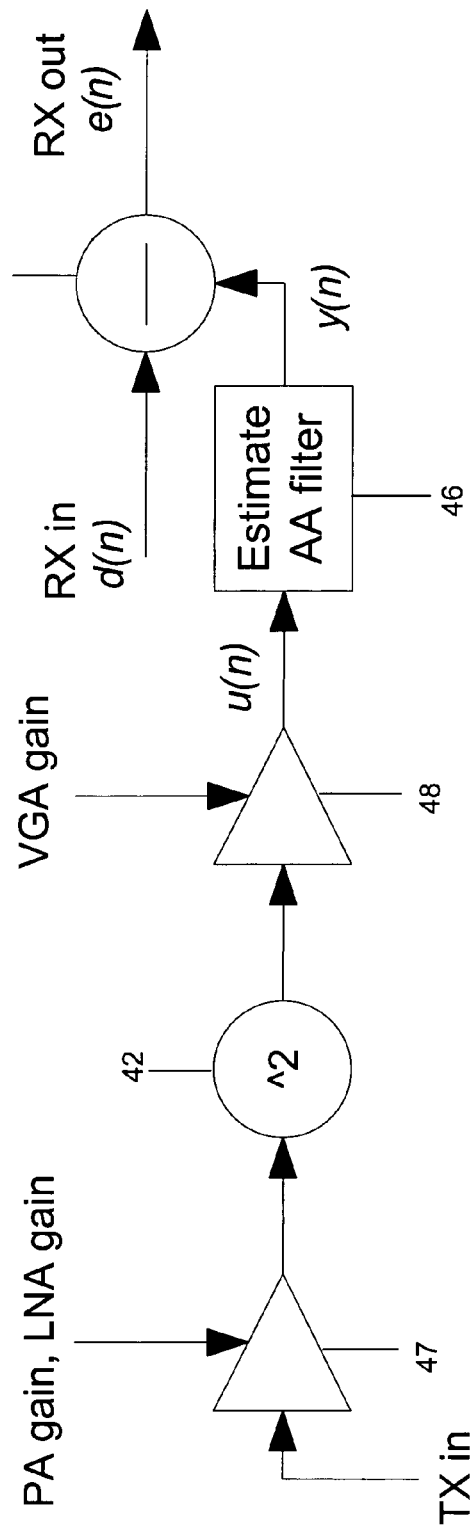
Figure 4(b)
Figure 5

METHOD AND APPARATUS FOR CROSS-TALK CANCELLATION

REFERENCE TO RELATED APPLICATIONS

The present application is the U.S. national phase of PCT International Patent Application No. PCT/GB2009/000125, filed Jan. 16, 2009, published on Jul. 23, 2009, as WO 2009/090400 A1, which claims the benefit of GB Patent Application No. 0800891.4, filed Jan. 17, 2008. The disclosures of the above-referenced applications are hereby incorporated by reference in their entireties into the present disclosure.

TECHNICAL FIELD

The present invention relates to a method and apparatus for cancelling cross-talk between the transmit and receive paths in a radio transceiver, and in particular for cancelling transmission cross-talk in the receiver.

BACKGROUND TO THE INVENTION

Direct converting transceivers are well known in the art. By "direct converting" it is meant that conversion is made directly from RF to baseband, without an intermediate frequency. Such direct converting transceivers may commonly be used in, for example, the radio of a mobile telephone, or the like. FIG. 1 illustrates the components of a typical direct converting transceiver which forms the basis of the present invention.

With reference to FIG. 1, here a baseband signal 10 is fed into the transmit path of the transceiver. The baseband signal 10 is filtered by a pulse shaping filter such as a root raised cosine (RRC) filter 12 so as to limit the bandwidth and hence limit spurious emissions. The output of the pulse shaping filter 12 is then input to an up-sampler 14, which increases the sampling rate from the typical four times oversampling of the baseband to provide a higher sampling rate for input to a transmit mixer 16. The transmit mixer 16 then modulates an RF carrier with the received up-sampled bit stream, to provide a modulated RF output signal, which is then input to a transmission amplifier 18. The transmission amplifier 18 is controlled by a transmission gain control signal, to apply a suitable signal gain to the modulated RF signal, for transmission. The amplified modulated RF signal is then input to duplexer 20, for feeding to antenna 21 for transmission.

With respect to the receiver signal path, antenna 21 receives modulated RF signals, which are fed via duplexer 20 into the receiver signal chain. The received signals are first amplified by low noise amplifier (LNA) 23, in accordance with an LNA gain control signal received by the low noise amplifier, and then demodulated from RF to baseband by receive mixer 22, which receives a suitable local oscillator signal. The thus obtained demodulated signals are then input to a receiver amplifier 24, which is controlled by a receiver amplifier gain control signal, in order to amplify the received signal by the required gain. The amplified and demodulated received signal is then input to anti-alias filter 26, to restrict the bandwidth of the signal prior to down sampling. The filtered received signal is then input to down sampler 28, which produces as baseband at four times oversampling rate, for processing by the remainder of the receiver signal chain. The down sampled received signal is then output to the rest of the receiver chain, as signal 30.

It will therefore be seen that the transmission path and the receiver path share the duplexer 20 in common, in order to be able to feed signals to and receive signals from the common antenna 21. In frequency division duplex systems where both the transmission chain and the receiver chain are active simultaneously, the problem of cross-talk between the transmission and receiver chain can therefore occur. In spite of chip planning and careful insulation between the transmitter chain and the receiver chain, the transmitted signal, due to its significantly higher signal power, can severely distort any received signal. The worst kind of distortion is clipping, where the transmitted signal saturates the transistors in the receiver chain. Clipping introduces non-linearities which may make restoration of the desired received signal impossible. Fortunately, clipping may be avoided by a properly designed automatic gain control (AGC) algorithm, and filtering.

In direct converting receivers particularly cross-talk is a problem, since here second order distortion introduced by the receive mixer 22 results in a cross-talk signal which is spectrally overlapping the receiver signal baseband, and thus is impossible to differentiate by spectral filtering, once introduced. The result from this kind of cross-talk is a decreased sensitivity due to the extra noise added by the cross-talk. Cross-talk in this way may be introduced either via poor on-chip transmitter and receiver path insulation, or from shared components such as the duplexer. Of these, the latter is believed to be the worst introducer of cross-talk into the receiver signal path, due to the power of the transmit signal present thereat.

Looking in closer detail at how cross-talk from the transmit signal can enter the receiver signal path, there are (at least) two ways for the transmit signal to enter the receiver path at baseband and thus distort the frequency range of the received, desired signal. It may be as an effect of inter-modulation distortion (IMD) in the receiver mixer in which case the transmit (TX) signal, $X_{TX}(f)$ (as a function of frequency), is part of either the received (RX) signal, $X_{RX}(f)$ or the local oscillator (LO) signal, $X_{LO}(f)$, in the mixer i.e.:

$$X_{RX}(f)=X_{RX}(f)+X_{TX}(f)\ X_{LO}(f)=X_{LO}(f)+X_{TX}(f)$$

Higher order nonlinearities project the transmit signal onto baseband, here exemplified by the distorted $X_{RX}(f)$. In particular, the output of the receiver mixer can be represented as:

$$Y(f)=X_{RX}(f)X_{LO}(f)+k_2(X_{RX}(f)X_{LO}(f))^2+k_3(X_{RX}(f)X_{LO}(f))^3+\ldots$$

Typically, the most significant of these terms is the second order inter-modulation distortion product (IMD2). Here, the square of the transmit signal TX results in:

$$(X_{RX}(f)X_{LO}(f))^2=((X_{RX}(f)+X_{TX}(f))X_{LO}(f))^2=X_{TX}^2(f)X_{LO}^2(f)+\ldots$$

Here, only the interfering part of the TX signal is shown on the right-hand side; there will also be a second order RX signal, as well as a product of the RX, TX, and LO signals. In this respect, the second order IMD is mixed down into the frequency band of interest in the receiver, and hence creates cross-talk. Higher order IMD products are of course also created, but these are either too weak to pose a problem, or they get mixed to other spectral locations, and hence, whilst they may appear as cross-talk in the receiver signalling chain, they will typically be filtered out, for example by the anti-aliasing filter.

Another effect that introduces cross-talk into the receiver chain is by self-mixing where the transmit signal is found in both the RX signal and the LO signal, as shown:

$$Y(f)=X_{RX}(f)X_{LO}(f)$$

First order mixing of the two then unavoidably results in cross-talk:

$$Y(f)=(X_{RX}(f)+X_{TX}(f))(X_{LO}(f))=X_{RX}(f)X_{LO}(f)+X_{RX}(f)X_{TX}(f)X_{LO}(f)+X_{TX}^2(f)$$

Here, the first term is the wanted signal, the middle two terms will be filtered out, and the last term (the second order term) is the cross-talk.

Thus, as a result of both IMD in the RX mixer and self-mixing the transmit signal can find itself mixed into the band of interest to the receiver. Of course, in a time division duplex (TDD) system this is not of concern, as the receiver is not listening for a signal at the same time as the transmitter is transmitting. However, for frequency division duplex (FDD) systems, where the transmitter is transmitting at the same time as the receiver is listening (on a different frequency) then transmit signal cross-talk in the receiver signal chain can cause significant problems, resulting in the receiver failing to detect and successfully demodulate a signal being received. Moreover, because the cross-talk signal has been mixed into the region of the frequency spectrum of interest to the receiver, spectral filtering of the cross-talk signal cannot be performed without likewise filtering the received signal of interest.

SUMMARY OF THE INVENTION

The present invention aims to address the above problem, and in particular the problem of a second (or higher) order representation of the transmit signal being mixed into the region of the frequency spectrum of interest to the receiver, such that it can not then be spectrally filtered out. At its most straightforward, in one embodiment of the invention this is achieved by providing a cross-talk cancellation unit which takes the transmit signal, and obtains the second (or higher) order representation thereof. This representation is then subtracted from the received signal before the signal is passed to the radio control receiver signal processing elements (i.e. the remainder of the received signal path not shown in FIG. 1). However, this is the least preferred arrangement, and in a more preferred arrangement a filter is also provided, to filter the second or higher order version of the transmit signal, prior to its being subtracted from the received signal. The filter basically estimates the effects of any other filtering or processing which has happened to the transmit signal in the receiver signal chain, such that the filtered higher order version of the transmit signal approximates the transmit signal cross-talk present in the receive signal processing chain at the same point. Thus, by subtracting the filtered higher order version of the transmit signal from the signal in the receive signal processing chain, the transmit cross-talk signal element of the receive signal is cancelled.

In an even more preferred embodiment, the transmit signal is preferably subject to amplification, preferably both prior to obtaining the second or higher order representation thereof, and thereafter, in order to replicate the signal gains applied in the power and low noise amplifiers (PA and LNA, respectively) and the variable gain amplifier (VGA). In other embodiments one or other amplifications stages may be used alone. The PA and LNA gain control signals, and VGA gain control signal can be used in the cross-talk cancellation unit to control the gain to be applied to the signal.

In the most preferred embodiment, the filter is an adaptive filter, and preferably a least mean squares (LMS) filter. This allows for compensation, for example, for component variations introduced in manufacturing, via aging, or for components with different sensitivities and sample variations between chips.

In view of the above from a first aspect the present invention provides a method of cross-talk cancellation in a transceiver having a transmitter which signal processes and transmits a transmit signal, and a receiver which receives and signal processes a receive signal, the receive signal including therein a transmit cross-talk signal being at least a partial representation of the transmit signal, the method comprising: obtaining the transmit signal to be signal processed and transmit by the transmitter; signal processing the transmit signal to produce a cross-talk cancellation signal, the signal processing comprising applying to the transmit signal one or more signal processing operations which emulate the generation of the transmit cross-talk signal from the transmit signal in the receiver; and combining the cross-talk cancellation signal with the receive signal containing the transmit cross-talk signal to thereby substantially remove or reduce the transmit cross-talk signal from the receive signal.

From a further aspect there is also provided a transceiver comprising: a transmitter which signal processes and transmits a transmit signal; and a receiver which receives and signal processes a receive signal, the receive signal including therein a transmit cross-talk signal being at least a partial representation of the transmit signal; the transceiver further comprising: a cross-talk canceller for substantially removing or reducing the transmit cross-talk signal from the receive signal, the cross-talk canceller comprising: an input for receiving the transmit signal to be signal processed and transmit by the transmitter; at least one signal processing element which signal processes the transmit signal received at the input to produce a cross-talk cancellation signal, the signal processing element being arranged to perform one or more signal processing operations which emulate the generation of the transmit cross-talk signal from the transmit signal in the receiver; and a signal combiner arranged to combine the cross-talk cancellation signal with the receive signal containing the transmit cross-talk signal to thereby substantially remove or reduce the transmit cross-talk signal from the receive signal.

From another aspect the invention also provides a cross-talk canceller for cancelling a cross-talk signal in a receiver due to a transmitted signal transmit from a transmitter, the cross-talk canceller comprising an input which receives a copy of the baseband signal to be transmit, at least one amplifier which amplifies the copy of the baseband transmission signal in dependence on amplifier gain factors applied to the transmit signal in the transmitter and/or a received signal in the receiver, a multiplier to increase the order of the baseband transmit signal to at least the second order in order to model the inter-modulation distortion in the baseband, an estimator which estimates the cross-talk signal path and filters the higher signal in accordance with the estimation to generate an estimated version of the cross-talk signal, and a subtractor which subtracts the estimated version of the cross-talk from the signal being processed by the receiver to thereby cancel the cross-talk signal therefrom.

The invention also provides a method of cancelling a cross-talk signal in a receiver due to a transmitted signal transmit from a transmitter, comprising receiving a copy of a baseband signal to be transmit; amplifying the copy of the baseband transmission signal in dependence on amplifier gain factors applied to the transmit signal in the transmitter and/or a received signal in the receiver; increasing the order of the baseband transmit signal to at least the second order; estimating the cross-talk signal path and filtering the higher order signal in accordance with the estimation to generate an estimated version of the cross-talk signal, and subtracting the estimated version of the cross-talk from the received signal being processed by the receiver to thereby cancel the cross-talk signal therefrom.

Further features and aspects of the present invention will be apparent from the appended claims.

BRIEF DESCRIPTION OF THE DRAWINGS

Further features and advantages of the present invention will also become apparent from the following description of embodiments thereof, presented by way of example only, and by reference to the accompanying drawings, wherein like reference numerals refer to like parts, and wherein:—

FIG. 3 is a block diagram of a transmit signal cross-talk canceller of a first embodiment of the present invention;

FIG. 4(*a*) is a block diagram of a transmit signal cross-talk canceller of a first variant of a second embodiment of the present invention;

FIG. 4(*b*) is a block diagram of a transmit signal cross-talk canceller of a second variant of a second embodiment of the present invention;

FIG. 5 is a block diagram of a transmit signal cross-talk canceller of a third embodiment of the present invention;

DESCRIPTION OF THE EMBODIMENTS

Figure 1:
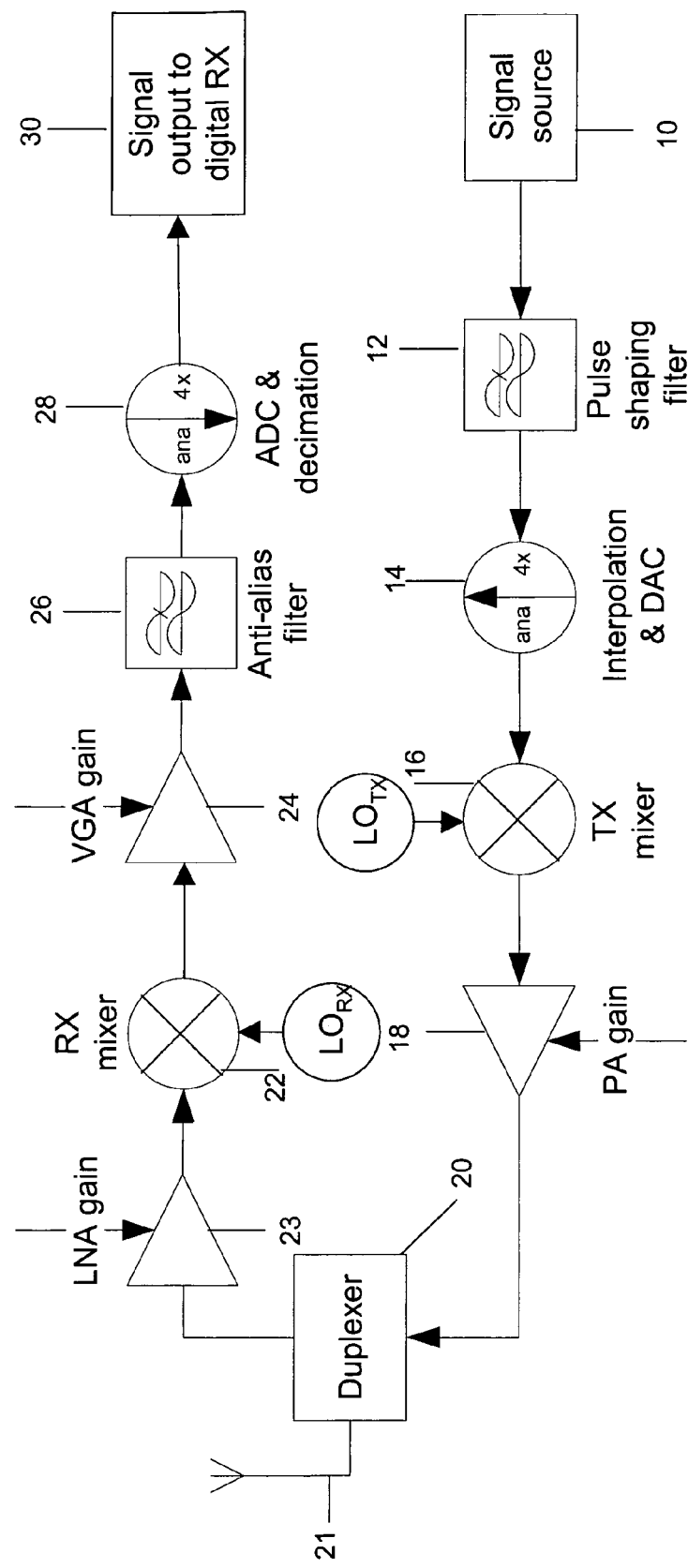
FIG. 1 is a block diagram of a typical direct conversion transceiver of the prior art.

Prior to describing the embodiments of the invention, it is first useful to describe the cross-talk model upon which the embodiments are based. The model is based on the typical prior art direct converting transceiver of FIG. 1. Here, the transmit signal originates from a number of channels and is combined into one and up sampled with the RRC filter. Following filtering the signal is modulated to RF and power amplified before it is finally transmitted through the antenna. For the purposes of the present model, transmit signal predistortion and corresponding analogue distortion are assumed ideal and are hence omitted.

In the receiver signal path, cross-talk is introduced essentially by the receive mixer. As noted previously, the cross-talk originates from both mixer non-linearities resulting in second and higher order inter-modulation distortion products, and also through self mixing. The distorted received signal (containing the transmit signal cross-talk) is then subject to dispersion in terms of anti-alias filtering, after which it is down sampled to the radio control receiver sampling rate of four times oversampling rate.

Considering now mathematically the origins of the cross-talk signal, the continuous time baseband signal $s_{bb}(t)$ may be expressed as:

$$s_{bb}(t)=a(t)+jb(t)$$

Modulating to RF gives the transmitted modulated RF signal $s_{rf}(t)$ as $$s_{rf}(t)=a(t)\cos(2\pi f_c t)-b(t)\sin(2\pi f_{ct})$$

The squared cross-talk signal $s_{rf}^2(t)$ is then $$s_{rf}^2(t) = (a(t)\cos(2\pi f_c t) - b(t)\sin(2\pi f_c t))^2 \Leftrightarrow$$

$$s_{rf}^2(t) = \frac{a^2(t)+b^2(t)}{2} + \left(\frac{a^2(t)-b^2(t)}{2} - a(t)b(t)\right)\cos(4\pi f_c t)$$

where, in the lower expression, the signal is presented as one baseband term $$\left(\frac{a^2(t)+b^2(t)}{2}\right)$$

and one doubled carrier frequency term (the remainder of the expression). The second term is spectrally located at twice the carrier frequency, and is removed in the receiver by the anti-alias filter. Only the baseband term is of any problem, as this is projected onto the received signal spectrum, and cannot be filtered out. It is also apparent that the baseband cross-talk term from second order inter-modulation distortion can be recreated by squaring the real and imaginary parts of the transmitted baseband signal $s_{bb}(t)$.

Figure 2:
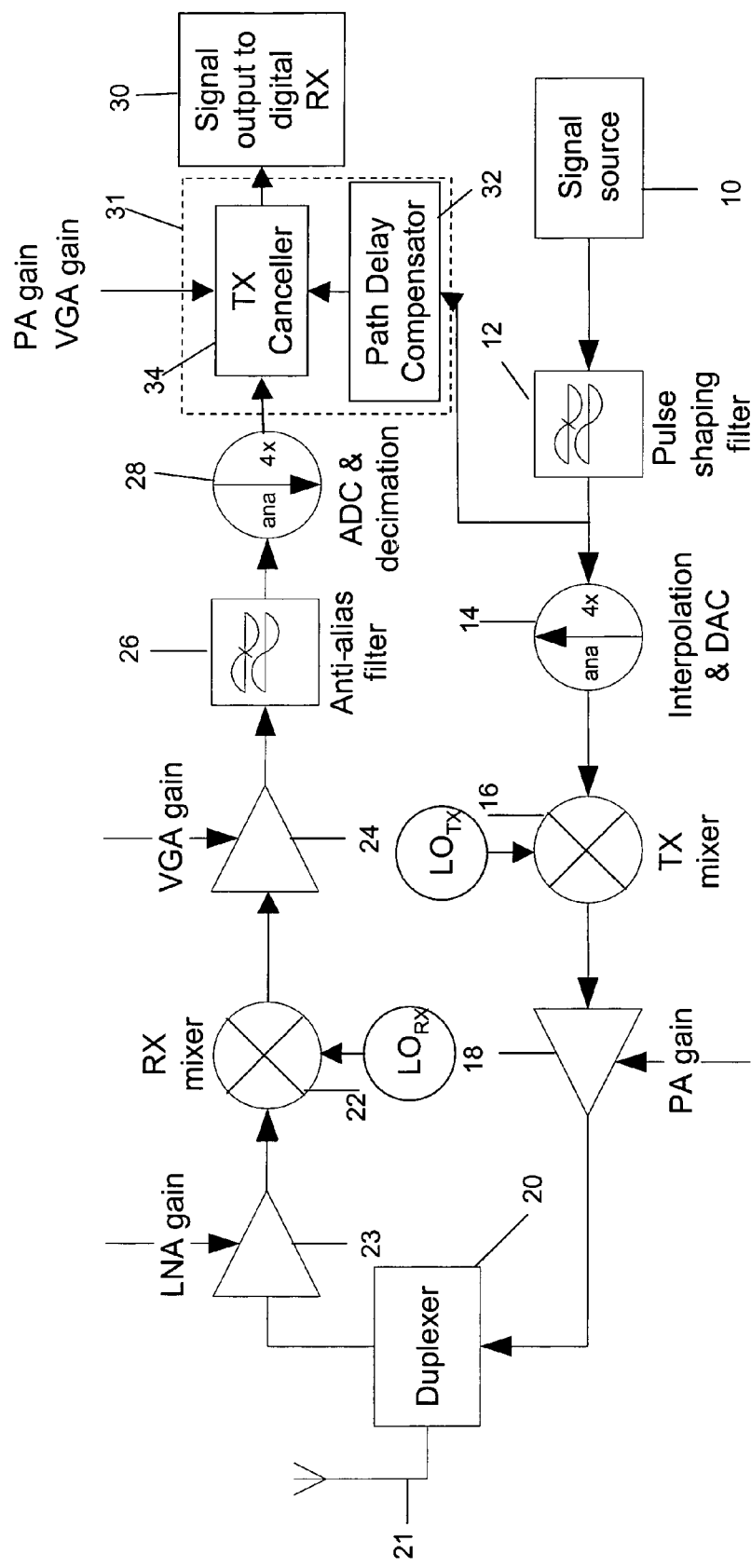
FIG. 2 is a block diagram which forms the basis of embodiments of the present invention.

Embodiments of the invention will now be described with reference to FIGS. 2 to 8. Each of the embodiments is based upon the general architecture of FIG. 2. Here as will be seen a direct conversion receiver is presented having the same components as FIG. 1, described previously. However, in addition to the components described previously with respect to FIG. 1 added into the direct conversion transceiver of FIG. 2 is cross-talk cancellation block 31, comprising path delay compensator 32, and transmit signal cross-talk cancellation unit 43. More particularly, a signal tap from the transmit signal chain taps off the baseband transmit signal after it has been processed by the root raised cosine filter 12, and feeds it to the path delay compensation block 32. Herein the signal is delayed, and is then fed to the transmit signal cross-talk cancellation unit 34. As shown in FIG. 2, the transmit signal cross-talk cancellation processing unit 34, also has input therein the receiver gain control signal, and the transmitter gain control signal. In some embodiments, however, these control signals are not used.

The path delay compensation block 32 delays the transmit signal by an appropriate amount of time which is the same as the path delay introduced by the up-sampler 14, transmit mixer 16, power amplifier 18, duplexer 20, low noise amplifier 23, receive mixer 22, variable gain amplifier 24, anti-alias filter 26, and down-sampler 28. Thus, the signal received from the path delay compensation block 32 at the transmit signal cross-talk canceller 34 is received at the same time as if it had passed through the transmitter signal chain, and the receiver signal chain, to the cross-talk canceller 34. The cross-talk canceller block 34 then cancels the second (or higher) order transmit signal cross-talk from the received signal, and the received signal is then output to the rest of the receiver chain, typically the radio control elements thereof.

As mentioned, each of the embodiments of the invention are based upon the architecture of FIG. 2, although in each of the embodiments the processing performed by the cross-talk canceller 34 is different.

FIG. 3 is a block diagram of the internal processing performed by the cross-talk canceller 34 in a first embodiment of the invention. In this embodiment, the receiver gain and transmitter gain control signals are not required, and need not be fed to the cross-talk canceller 34.

With reference to FIG. 3, the transmit signal is received at the "TX in" input, having been delayed by the path delay compensation block 32. The input transmit signal is then put into processing block 42, which acts to perform a squaring operation thereon. In this respect, it will be recalled that it is the square of the transmit signal which is the main cross-talk signal of interest, due to the second order inter-modulation distortion product, or self mixing in the receive mixer 22. The squared transmit signal, u(n) is then fed to a subtractor 44.

The second input to the subtractor 44 is the received signal, d(n), received at the cross-talk canceller 34 from down-sampler 20. It will be appreciated here that the respective sampling rates of the squared transmit signal, and the received signal are the same, because the transmit signal was tapped off from the transmit signal chain before processing thereof by the up-sampler 14. Likewise, the cross-talk canceller 34 is located in the received signal chain after the down-sampler 28.

The subtractor 44 then acts to subtract the copy of the transmit signal u(n) from the input receive signal to provide a receive output signal e(n) i.e.:—

$$e(n)=d(n)-u(n)$$

The output signal from the cross-talk canceller is then fed to the rest of the receiver signal processing chain, as output signal 30.

Within the first embodiment, therefore, a relatively crude cross-talk cancellation is performed, by simply subtracting a square of the transmit signal from the received signal. This is noted to be crude for the reason that within the first embodiment no attempt is made to account for the processing of the transmit cross-talk signal which has, been undertaken by the earlier parts of the receiver signal processing chain, such as, for example, the anti-aliasing filter 26. For example, the square of the cross-talk signal is filtered by the anti-aliasing filter, which results in dispersion of the signal i.e. the signal is smeared in time, but by subtracting a square of the original transmit signal from the receiver signal it may be that the cross-talk canceller is in fact subtracting only a crude approximation of the transmit cross-talk signal as it appears at that point in the receiver signal processing chain. However, insofar as at least a version of the second order transmit signal has been deleted from the receiver signal chain, then at least some of the transmit signal cross-talk will have been cancelled from the received signal.

FIG. 4(a) illustrates a first variant of a second embodiment of the invention, and in particular the signal processing performed by the cross-talk canceller 34 therein. In particular, the signal processing performed by the cross-talk canceller 34 in any variant of the second embodiment of the invention is aimed at addressing, at least partially, some of the concerns presented above in respect of the first embodiment.

With reference to FIG. 4(a), it will be seen that the transmit cross-talk canceller 34 of the first variant of the second embodiment comprises a transmit signal input, at which the transmit signal delayed by the path delay compensation block 32 is input. The input transmit signal is then fed to processing unit 42, where it is subject to a squaring operation. In this respect, it is recalled that it is the second order transmit signal which constitutes the most problematic cross-talk in the receiver signal processing chain. The output of the processing unit 42, being the squared transmit signal u(n) is then input into a filter 46. In this case, the filter 46 attempts to model the cross-talk signal path. In this respect, the transmit cross-talk signal has undergone power amplification in the transmitter power amplifier, further amplification in the receiver low noise and variable gain amplifiers, and filtering in the anti-alias filter. The anti-alias filter will have acted to restrict the bandwidth of the cross-talk signal. Therefore, the transmit cross-talk signal, when compared to the input transmit signal input into the cross-talk canceller at the "TX in" input has been subject to the above mentioned processing operations, which the transmit signal input at TX in has not. Therefore, as discussed previously in the first embodiment, the squared transmit signal u(n) is but a crude approximation of the transmit signal cross-talk, which is actually present in the received signal at the cross-talk cancellation unit.

To try and emulate the signal processing operations which the transmit cross-talk signal has thus undergone in the transmit and receive signal chains prior to the cross-talk canceller, the filter 46 is provided which, as mentioned, estimates the cross-talk signal path and filters the squared transmit signal in accordance with the estimation. Furthermore, where the transmitter gain and receiver gain applied respectively in the transmit and receive amplifiers is fixed, the filter may also compensate for the gains which have been applied to the transmit cross-talk signal. Effectively, therefore, the filter 46 has a transfer function which is an estimate of the cross-talk signal path including, in this embodiment, the anti-aliasing filter. Additionally, where the transmit and receive amplifier gains are fixed, then the filter transfer function can also be arranged to adjust the signal level of the squared transmit signal u(n), so as to approximate the signal level of the transmit cross-talk signal present in the receive signal. The filter 46 then outputs the filtered and signal level adjusted squared transmit signal as signal y(n) for input into the second input of the subtractor 44. The subtractor 44 then subtracts the signal y(n) from the receive signal d(n), as follows:—

$$e(n)=d(n)-y(n)$$

The received signal e(n) therefore has substantially much of the transmit signal cross-talk subtracted therefrom.

The cross-talk canceller 34 of the first variant of the second embodiment is therefore much improved upon the cross-talk canceller of the first embodiment, by virtue of the inclusion of the filter 46. As mentioned, the filter 46 reverses the processing applied by the anti-aliasing filter (essentially therefore applying a whitening operation), and, where the gains applied to the transmit cross-talk signal by the transmitter and receiver amplifiers are fixed, then the filter can also to take into account these gains, to increase the signal level of the squared TX in signal to the same level as the transmit cross-talk signal, which has been subject to the same gains. Therefore, the signal which is output by the filter, y(n), is a much closer representation to the transmit cross-talk signal present in the received signal at the point in the receiver signal processing chain where the cross-talk canceller 34 is located. Thus, subtractor 44 is therefore subtracting a much more accurate representation of the transmit cross-talk signal from the received signal, thus giving a more accurate received signal with the transmit cross-talk cancelled therefrom.

However, it should be noted that with a fixed filter transfer function such as present in filter 46, it is only possible to adapt the transmit signal to match the transmit cross-talk signal if the processing applied to the transmit cross-talk signal is substantially fixed i.e. the anti-alias filter 26 has a substantially fixed and known transfer function, and the gains applied to the transmit cross-talk signal in the transmit and receive amplifiers are constant. If any of these factors are variable, such as may often be the case with the gains applied in the transmitter power amplifier and receiver variable gain amplifier, or where the filter transfer function is not known, or varies over time, then the output signal y(n) from the filter 46 may not then accurately represent the transmit cross-talk signal at the point in the receiver signalling chain where the cross-talk canceller is located. To address the second of these problems, i.e. where the filter transfer function is not known or is variable over time (for example due to component aging), a second variant of the second embodiment is shown in FIG. 4(b).

Within the variant of the second embodiment shown in FIG. 4(b), the fixed transfer function filter is replaced by an adaptive filter. In particular, in this embodiment the adaptive filter is a "least mean squares" adaptive filter, as is known per se in the art. The LMS filter receives the output signal e(n) from the subtractor 44, and correlates the signal with the higher order transmit signal u(n). The filter taps are then adjusted to produce a filtered higher order transmit signal which when subtracted from the receive signal reduces (with the intention of removing completely) the cross-talk signal from the receive signal i.e. such that the correlation is reduced. Further details of the operation of the LMS filter, including details of the adaptation algorithm thereof, are given below in relation to the fourth embodiment. However, the LMS filter of the present embodiment operates in the same manner, and hence reference is made to the later description for a full description of the operation thereof.

The provision of the LMS filter addresses the second problem noted above i.e. that of the AAF transfer filter function being unknown, or changeable over time. This is because the LMS is able to adapt its transfer function so as to attempt to remove any correlation between the input signal e(n) from the subtractor 44 and the higher order transmit signal, and thus the adaptation implicitly takes into account changes in the transfer function of the cross-talk signal path, including changes in the transfer function of the anti-aliasing filter.

There remains, however, the problem of the gains which are applied to the receive signal, and hence the cross-talk signal, being variable. This presents problems even for an adaptive filter that the dynamic range of the filter taps needs to be very large to compensate for signal level changes. Additionally, the adaptation rate of the filter may not be quick enough to compensate for rapid gain changes. Therefore, in the third embodiment, described next, the filter 46 is supplemented by additional amplifiers, to replicate the transmitter and receiver amplifier gains applied to the transmit cross-talk signal.

A third embodiment of the invention is therefore shown in FIG. 5. In particular, FIG. 5 shows the arrangement of the cross-talk canceller 34 of the third embodiment, the remainder of the elements of the third embodiment being the same as described previously with respect to FIGS. 1 and 2.

As shown in FIG. 5 the cross-talk canceller 34 according to the third embodiment comprises a "TX in" input, at which the transmit signal is input into the cross-talk canceller 34, having passed through the path delay compensation unit 32. A first amplifier 47 is then provided to receive the input transmit signal, and which also receives a copy of the PA gain control signal, input to the transmit power amplifier 18. The amplifier 47 amplifies the transmit signal in accordance with the product of the PA gain control signal and the LNA gain control signal, such that the transmit signal is then at substantially the same signal level as the transmit signal which is present at the input to the RX mixer 22. The reason for including both the PA gain and the LNA gain in this first amplifier 47 is that this first amplifier is before the squaring operation performed by component 42, which represents the second order cross-talk generation as produced by the RX mixer 22. With reference to FIG. 1 again, it will be seen that, from the viewpoint of the input to the RX mixer 22, the TX signal has been amplified twice by the PA gain factor and the LNA gain factor. The first amplifier 57 therefore models both these amplification stages in one stage.

The amplified transmit signal is then input to the processing unit 42, wherein a squaring operation is applied thereto, as in the previous embodiments. The squared and amplified signal is then input to a second amplifier 48, which also receives as a control signal the receiver gain control signal, input to receiver amplifier 24. Amplifier 48 then amplifies the squared transmit signal by the appropriate gain factor indicated by the VGA gain control signal i.e. the post RX mixer gain, and then outputs the further amplified and squared transmit signal as signal u(n).

Signal u(n) is then input to filter 46, which whitens the signal, to reverse the filtering performed by anti-alias filter 26. In this respect, when compared to the second embodiment described previously, filter 46 in the third embodiment does not need to try and adjust the signal u(n) to compensate for the transmitter and receiver amplifier gains. In the third embodiment the amplifiers 47 and 48 in the cross-talk canceller perform this function. Hence, the filter 46 will not need to account for gain changes but only consider the more constant signal dispersion, which decreases the filter adaptation requirements.

The filtered output signal y(n) output from filter 46 is then input to subtractor 44, and is subtracted from the received signal d(n), to give the output signal 30, signal e(n) as follows:

$$e(n)=d(n)-y(n)$$

Within the third embodiment, therefore, because the amplifiers 47 and 48 are included, which amplify the transmit signal by the appropriate PA gain control factor, LNA gain control factor, and VGA gain control factor which are used in the power amplifier 18, low noise amplifier 23, and VGA 24, then where the power amplifier 18, low noise amplifier 23, and variable gain amplifier 24 apply variable gains in response to their gain control signals, those same variable gains are applied in the cross-talk canceller, in order to obtain as close as possible a version of the transmit cross-talk signal for subtraction from the received signal, to thereby cancel the transmit cross-talk signal therein.

With the above arrangement, therefore, the signal y(n) output from the filter should be very similar to the transmit cross-talk signal present in the received signal d(n). This is because if one compares the signal processing operations noted in FIG. 5 with FIG. 2 it will be seen that each signal processing operation which is not reversed by a corresponding reverse signal processing operation in the transmit chain on its way to the duplexer, and then from the duplexer down the receiver signal chain to the cross-talk canceller is reproduced in the cross-talk canceller. In particular, note that the transmit signal input to the cross-talk canceller is taken from the output of the RRC filter. The transmit signal output from the RRC filter is then up sampled and modulated to RF by up sampler 14 and transmit mixer 16. The modulated RF signal is then amplified by transmit power amplifier 18, and fed to duplexer 20. Here the signal also enters the receiver signal processing chain as the transmit cross-talk signal.

In the receiver signal processing chain the transmit cross-talk signal is subject to second order inter-modulation distortion in receive mixer 22, resulting in second and higher order harmonics which, to some amount, are projected on baseband, and is then subject to further amplification in receiver amplifier 24, followed by anti-alias filtering in filter 26. The up sampling applied in up sampler 14 is then removed by down sampler 28. Thus, at the point the transmit cross-talk signal embedded in the receive signal enters the cross-talk canceller, in view of the fact that the up sampling and modulation has been removed in the cross-talk signal, the remaining signal processing operations are the amplification by the transmitter power amplifier and receiver amplifier, and the anti-alias filtering.

Returning now to FIG. 5, it will be seen that these same signal processing operations are applied to the transmit signal in the cross-talk canceller. In particular, the transmit signal output from the RRC filter is subject to amplification by the same gain as is applied in the transmitter amplifier, and is then squared to simulate the self mixing and second order intermodulation distortion introduced by the receive mixer. The squared signal is then further amplified by the same gain as is applied in the receiver amplifier, and then subject to filtering to correspond to the filtering of the anti-alias filter. The signal output from filter 46 should therefore be an accurate representation of the transmit cross-talk signal present in the received signal. As such, by subtracting the output of the filter 46 from the received signal, the transmit cross-talk signal present in the received signal can be cancelled therefrom.

Whilst the third embodiment just described therefore provides for transmit signal cross-talk cancellation from the received signal, because the filter transfer function is fixed, any changes in the overall transfer function applied to the transmit cross-talk signal found in the receive signal will reduce the accuracy of the cross-talk cancellation. For example, if the transfer function of the anti-alias filter was to change, for example through component aging, variation, or deliberately through adaptation or calibration, then the fixed filter 46 of the previous embodiment would no longer compensate for the transfer function of the adapted anti-alias filter, and hence the transmit signal subtracted from the receive signal may not as accurately represent the transmit signal cross-talk present in the received signal. In order to address concerns such as these, FIG. 6 presents a fourth embodiment of the invention, wherein the filter 46 is replaced with an adaptive filter 50, in this case using the least mean squares algorithm for the adaptation thereof.

Figure 6:
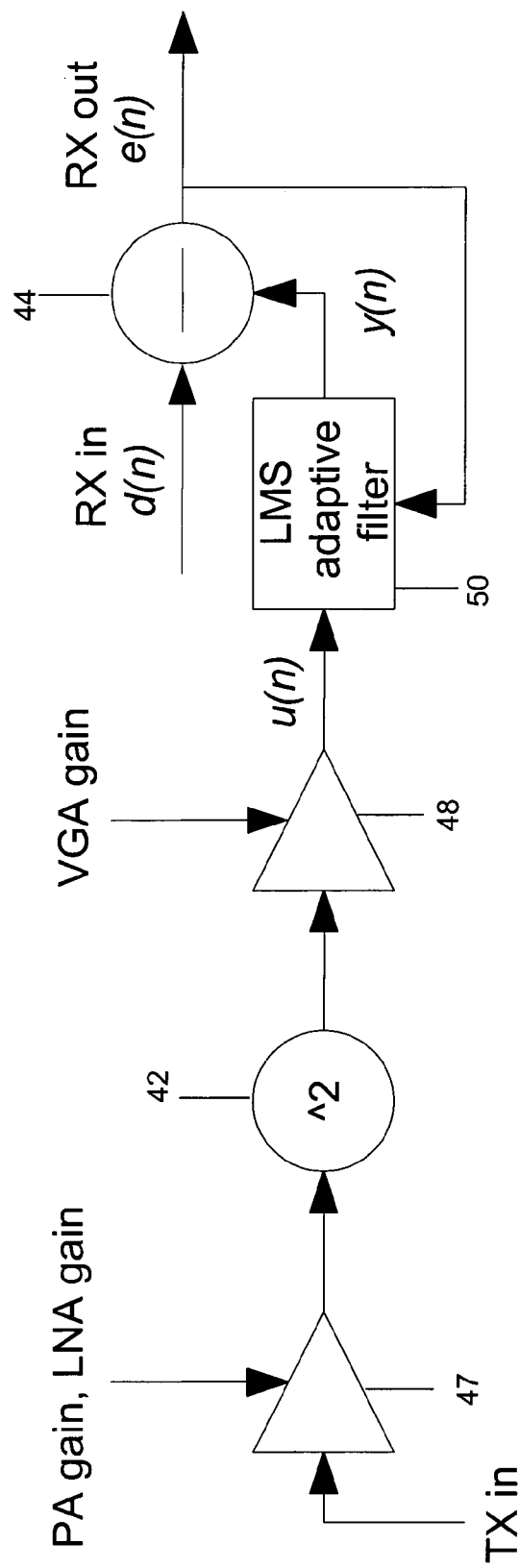
FIG. 6 is a block diagram of a transmit signal cross-talk canceller of a fourth embodiment of the present invention.

More particularly, as shown in FIG. 6 the cross-talk canceller 34 of the fourth embodiment receives the transmit signal from the output of the pulse shaping filter 12 via the path delay compensation block 32, and this is input to a first amplifier 47, which amplifies the signal in accordance with the power amplifier and low noise amplifier gain control signals. The amplified signal is then squared in processing block 42, and then input to a second amplifier 48, which further amplifies the signal in accordance with the variable gain amplifier control signal. The resulting signal u(n) is then input to the LMS adaptive filter 50. Further details of the operation of the LMS adaptive filter 50 will be given later.

The LMS adaptive filter 50 provides an estimate of d(n), referred to as y(n), based on the input signal u(n). The residual signal, e(n), from subtracting y(n) from d(n) will be uncorrelated to u(n). As in the previous embodiments, the LMS adaptive filter filters the signal to try and compensate for the bandwidth limitation imposed on the transmit signal crosstalk by the anti-alias filter in the receiver path. In the same manner as the previous embodiments, the signal output from the adaptive filter 50, y(n), is then subtracted by subtractor 44 from the received signal d(n), to give an output signal e(n) i.e.

$$e(n)=d(n)-y(n)$$

However, different from the previous embodiments, because the adaptive filter 50 is adaptive, then it requires feedback of the output signal e(n) back to the filter, such that adaptation of the filter coefficients can then take place. Here, the adaptation of the adaptive filter is to correlate e(n) with u(n). If there is any correlation then the filter vector is adjusted to attempt to remove the correlation.

More particularly, the LMS algorithm is composed of two parts; the output sample computation, and the adaptive filter update. The output sample computation in the block LMS algorithm defines the receive signal as d(n). Furthermore, a linearised reference signal is defined as u(n), and in vector form with the K most recent samples, $$u(n)=[u(n) \ldots u(n-K+1)]^T$$

Note that u(n) is actually a real signal for which reason the complex notation below is identical to two real implementations, one each for I and Q, respectively. The filter vector $w_m$, where m represents the $m^{th}$ block, is of same size as u. The output from the adaptive filter is then found as $$y(n)=w_m^H u(n)$$

and the cross-talk free residual signal, e(n), is found as $$e(n)=d(n)-y(n)$$

as mentioned previously.

Figure 12:
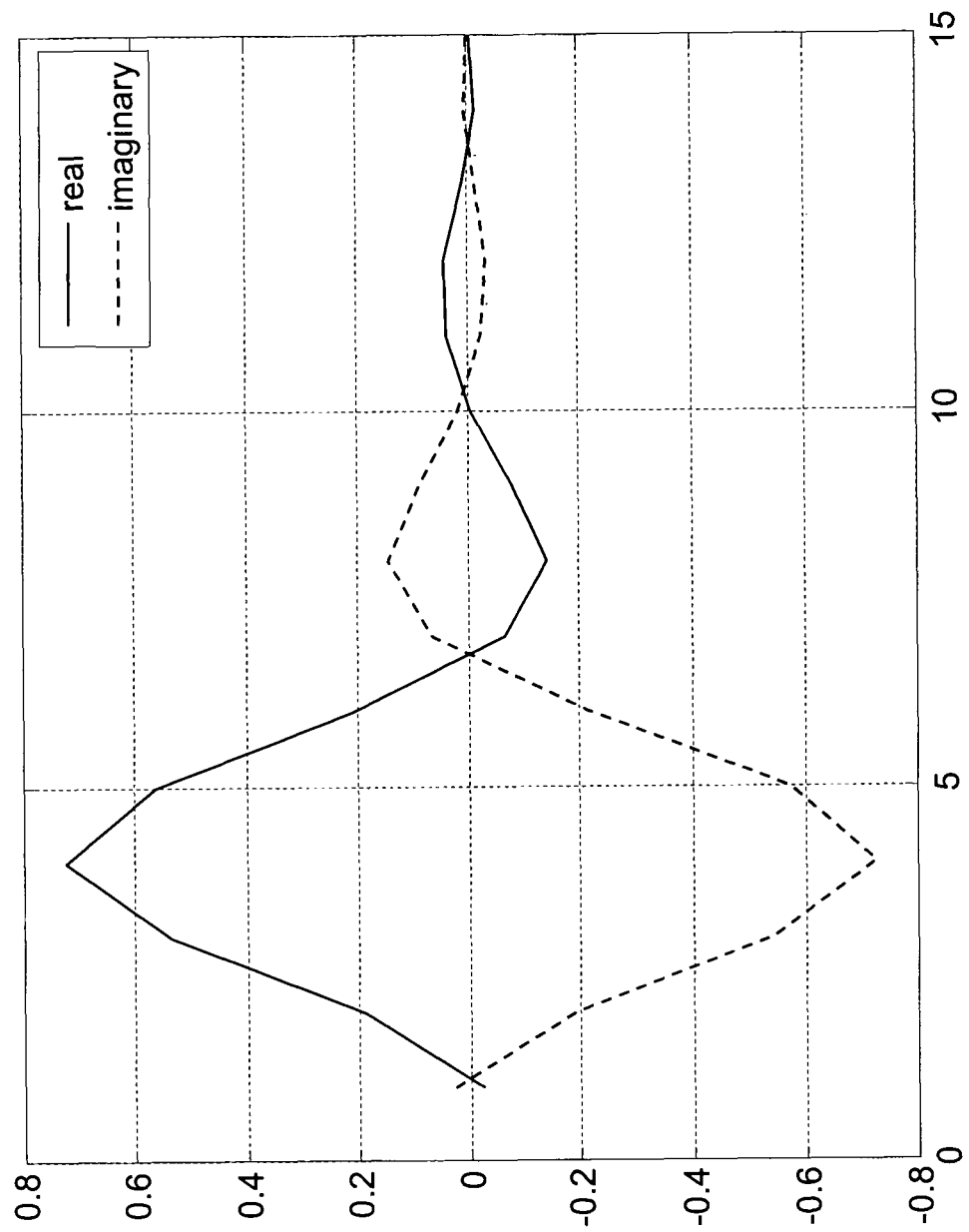
FIG. 12 is a graph illustrating a filter impulse response of the adaptive filter used in the fourth embodiment.

Update of the adaptive filter is performed by computing the correlation vector r between the reference vector u and e over a block of M samples according to $$r_m = \frac{1}{M} \sum_{k=n-M+1}^{n} u(k)e^*(k)$$

after which w is updated as $$w_{m*+1}=w_m+\mu r_m$$

where * represents the conjugate and μ is an update factor controlling the convergence speed and accuracy of the LMS algorithm. FIG. 12 presents the impulse response of the adaptive filter.

An interpretation of the complex filter tap vector w, is that it estimates the path from the TX reference point (after the RRC filter) to the adaptive filter, disregarding pre-processing operations such as squaring and transmitter and receiver amplifications. As such it is likely that the real and imaginary parts of w are similar, if not identical. Hence, in further embodiments it may be possible to use only one filter for both I and Q paths, adding only an individual, amplification factor in the end, assuming different interference levels are possible. The advantage with this is that twice the number of samples would be available for adaptation which in turn could give faster adaptation.

In terms of the need for adaptation, and the stability of the filter, transmit cross-talk is believed to be rather stationary in its behaviour. Hence, the need for adaptation may only be initial or repeated rarely, apart from transmitter and receiver amplification which are not included in the adaptation process. Furthermore, the LMS algorithm is known to be stable if only given sufficient background noise. In order to handle low background noise it may be necessary to disconnect adaptation. Hence, a disabling function for the adaptation process is a preferable requirement.

As mentioned previously, in order to optimise performance of the limited length filter w, the reference samples should be delayed, $$u(n, l) = [u(n-l) \ldots u(n-l-K+1)]^T \ 0 \le l \le L-K+1$$

to mimic the delay of the TX parasitics such that the filter energy is maximised, i.e., $$k = \arg_l \max(w^H w)$$

L is here the length of the reference sample TDL.

In the fourth embodiment, instead of making use of the path delay compensation block delay compensation may be done heuristically with a low complexity in the filter by comparing the ends (i.e., beginning and end) of |w|, and moving u and w one step if the difference between the combined filter tap magnitudes of the ends is too large, provided that l is within its limitations. Path delay is believed to be constant both in time and individuals and hence can be initialised fairly accurately.

The above described embodiments concentrate cancelling transmit signal cross-talk in the receive path which is due to either self mixing, or the second order inter-modulation distortion product. In this respect, cross-talk due to self mixing is also of the second order, hence by concentrating on removal of the second order of the transmit signal both self mixing cross-talk and the second order inter-modulation distortion product can be cancelled.

Figure 7:
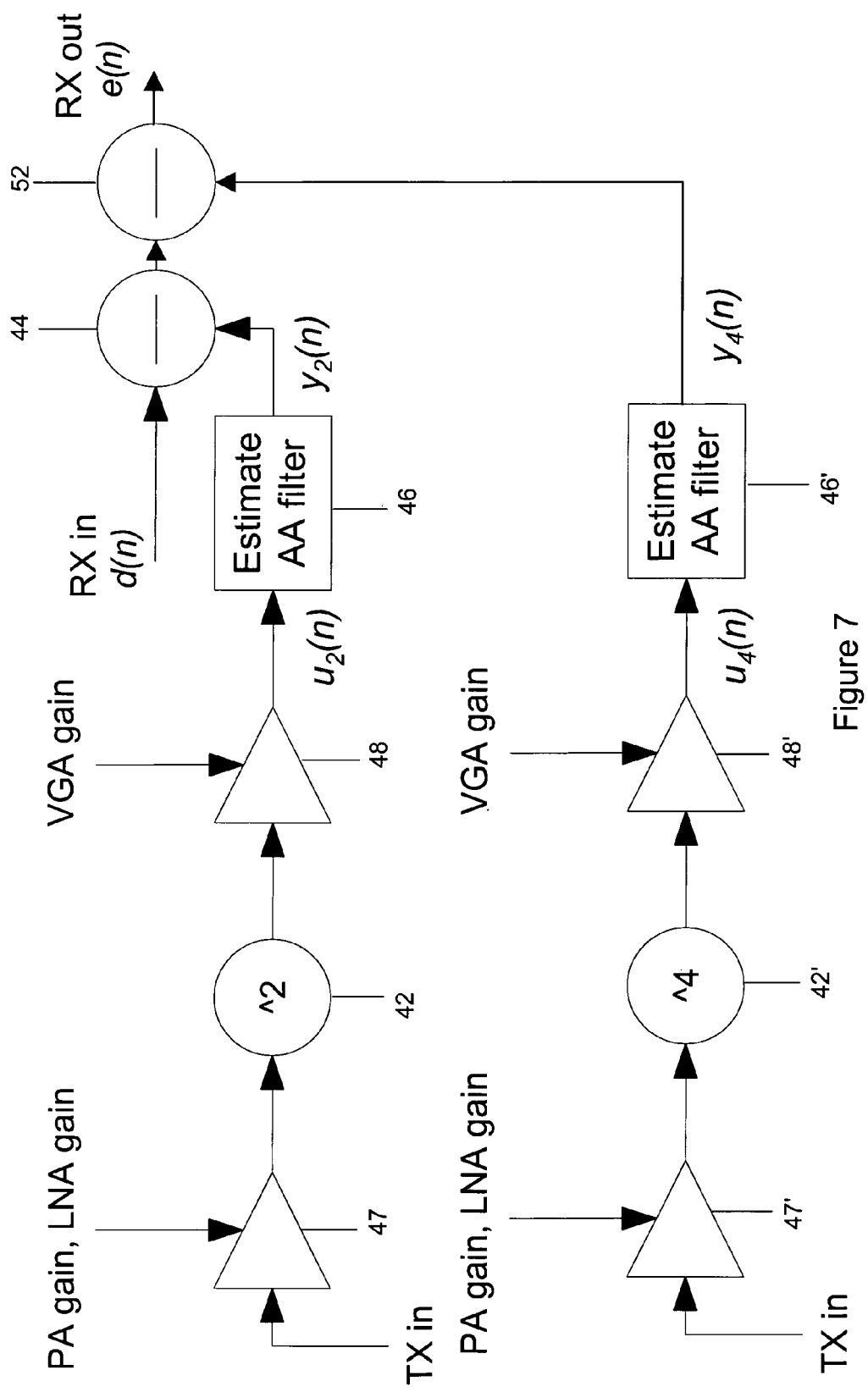
FIG. 7 is a block diagram of a transmit signal cross-talk canceller of a fifth embodiment of the present invention.

However, in other embodiments of the invention it may also be useful to cancel higher order transmit signal cross-talk, for example the fourth order, sixth order, or higher. This would typically be in addition to the second order cross-talk cancellation, but may, in other embodiments, be as an alternative. In order to provide for higher order cross-talk cancellation, in a fifth embodiment the cross-talk canceller 34 may be modified even further, to add in an additional signal processing chain which deals with higher order cross-talk. FIG. 7 illustrates an example according to the fifth embodiment, where both second order and fourth order cross-talk is cancelled.

With reference to FIG. 7, here it will be seen that the cross-talk canceller 34 of FIG. 2 comprises a first signal processing chain, which receives the transmit signal via the path delay compensation block 32, at a first TX in input, and thereafter the signal is processed by amplifier 47, processing unit 42, amplifier 48, and filter 46, as described previously with respect to the third embodiment. The resulting signal is then subtracted from the receive signal by subtractor 44. The operation of the above mentioned signal processing blocks has been described previously with respect to the third embodiment, and hence further description will not be undertaken.

The fifth embodiment, however, further provides a second signal processing path, which also receives the same transmit signal input thereto, received from the path delay compensation block 32. Additionally, the transmitter gain control and receiver gain control signals are also used by the second signal processing chain. The second signal processing chain comprises an amplifier 47', a processing unit 42', and a second amplifier 48'. Additionally, a further filter 46' is also provided. Here, the input transmit signal is amplified by the first amplifier 47', in accordance with the transmitter gain control signal. The thus amplified signal is then multiplied to the power of 4 by the processing unit 42', to give a fourth order transmit signal. The fourth order transmit signal is then amplified further, by amplifier 48', in accordance with the receiver gain control signal. The resulting signal $u_4(n)$ is then input to filter 46', which, as with filter 46, is arranged to estimate the cross-talk signal path, and filter the amplified fourth order signal in accordance with the estimate. The resulting filtered signal $y_4(n)$ is then output to a second subtractor 52. The second subtractor 52 receives the output of the subtractor 44, and then subtracts the generated version of the fourth order transmit cross-talk signal from the received signal. The received signal is then output as signal e(n), corresponding to:

$$e(n) = d(n) - y_2(n) - y_4(n)$$

where $y_2(n)$ is the locally generated version of the second order transmit cross-talk signal, generated in the cross-talk canceller, and $y_4(n)$ is the locally generated version of the fourth order transmit cross-talk signal, generated in the cross-talk canceller.

With the fifth embodiment, therefore, both second order transmit cross-talk, and fourth order transmit cross-talk may be cancelled from the received signal.

Figure 8:
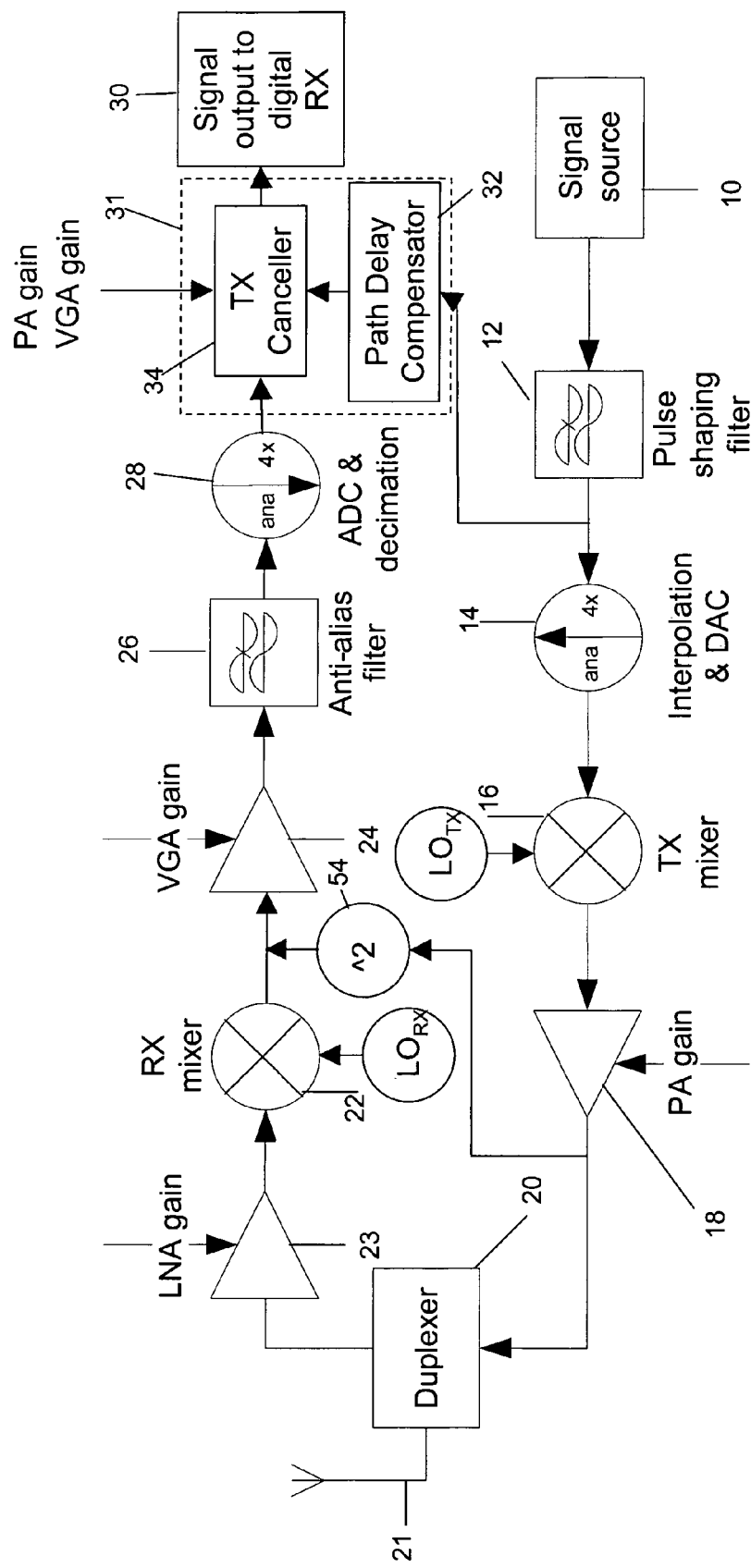
FIG. 8 is a block diagram illustrating a simulation model of a direct conversion receiver for the purposes of testing an embodiment of the present invention.

In order to demonstrate the effectiveness of the cross-talk canceller of the present invention a simulation model, based on the transceiver architecture of FIG. 2, and adding in the path delay compensation block 32, and the cross-talk canceller 34 was derived. FIG. 8 illustrates the simulation model. Here, the cross-talk canceller 34 has an internal architecture corresponding to the fourth embodiment of FIG. 6, described previously, which makes use of the LMS adaptive filter. Because otherwise the signal processing components of the simulation model are ideal, and hence the receive mixer 22, being ideal does not introduce inter-modulation distortion, in order to provide for the introduction of a transmit cross-talk signal into the receiver signalling chain, processing unit 54 was provided, which receives the output of the transmitter amplifier 18, squares that output, and then injects it into the receiver signalling chain, after the receive mixer 22. Thus, in the simulation model of FIG. 8, the transmit signal cross-talk is this second order signal injected into the receiver signal processing chain. It is therefore the function of the cross-talk canceller 34 to remove this cross-talk from the receive signal.

In addition to the simulation model of FIG. 8, which represents a simplified UE (user equipment), a node B simulator was also used, corresponding substantially to the simplified UE. However, the modulation applied in the node B used a QPSK constellation, whereas in the UE an HBPSK modulation was used. The channel used in the simulations is a Dirac channel, and furthermore no added white Gaussian noise was added due to the AWGN properties of the signal itself. The receiver of both the UE and the node B are similar, making use of a fourth order Butterworth filter as the anti-aliasing filter. As mentioned, the transmit cross-talk signal was introduced after demodulation, to comply with the analogue behaviour. Analogue signals were modelled as discrete time signals at 128 times oversampling rate. Furthermore, the reference signal was down sampled to four times oversampling rate to fit the digital hardware used in the receiver. Both the in phase and quadrature parts of the signal in the receiver are equally contaminated by cross-talk, although this is not required in the model.

Performance was assessed by comparing the receiver outputs of a UE including a TX cross-talk model with a reference receiver without cross-talk. An error vector magnitude (EVM) was used as performance measure and is defined as:

$$EVM = \frac{(e_{UE} - e_{ref})^H (e_{UE} - e_{ref})}{e_{ref}^H e_{ref}}$$

Figure 9:
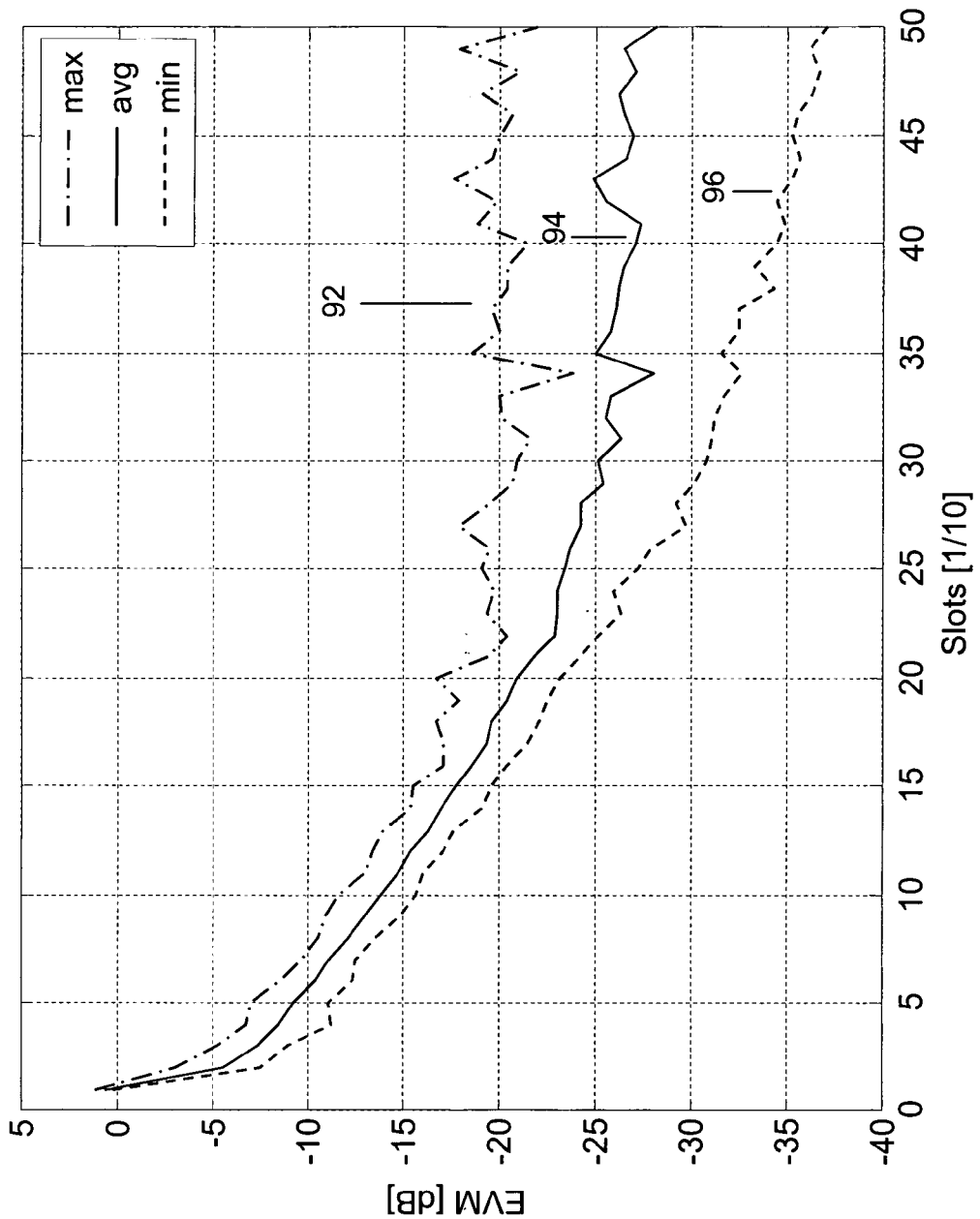
FIG. 9 is a graph illustrating results from a simulation of an embodiment of the present invention.

Results are presented for stationary performance, i.e., where TX gain is constant. The performance is presented in FIG. 9 for 100 simulations using a filter length K=15 samples, a block length M=1024 and update factor $\mu=2^{-3}$. The maximum, average, and minimum EVM figures are presented.

Note that the worst performer at one time may not be the worst performer at another time. As can be seen in the figure, performance is in average reduced 10 dB within the first half slot, 20 dB within 2 slots and reaches its stationary performance of >25 dB after 4 slots. The performance in the figure is from a filter initialized with the zero vector. Assuming an à priori known filter, the convergence time can be improved significantly.

Figure 10:
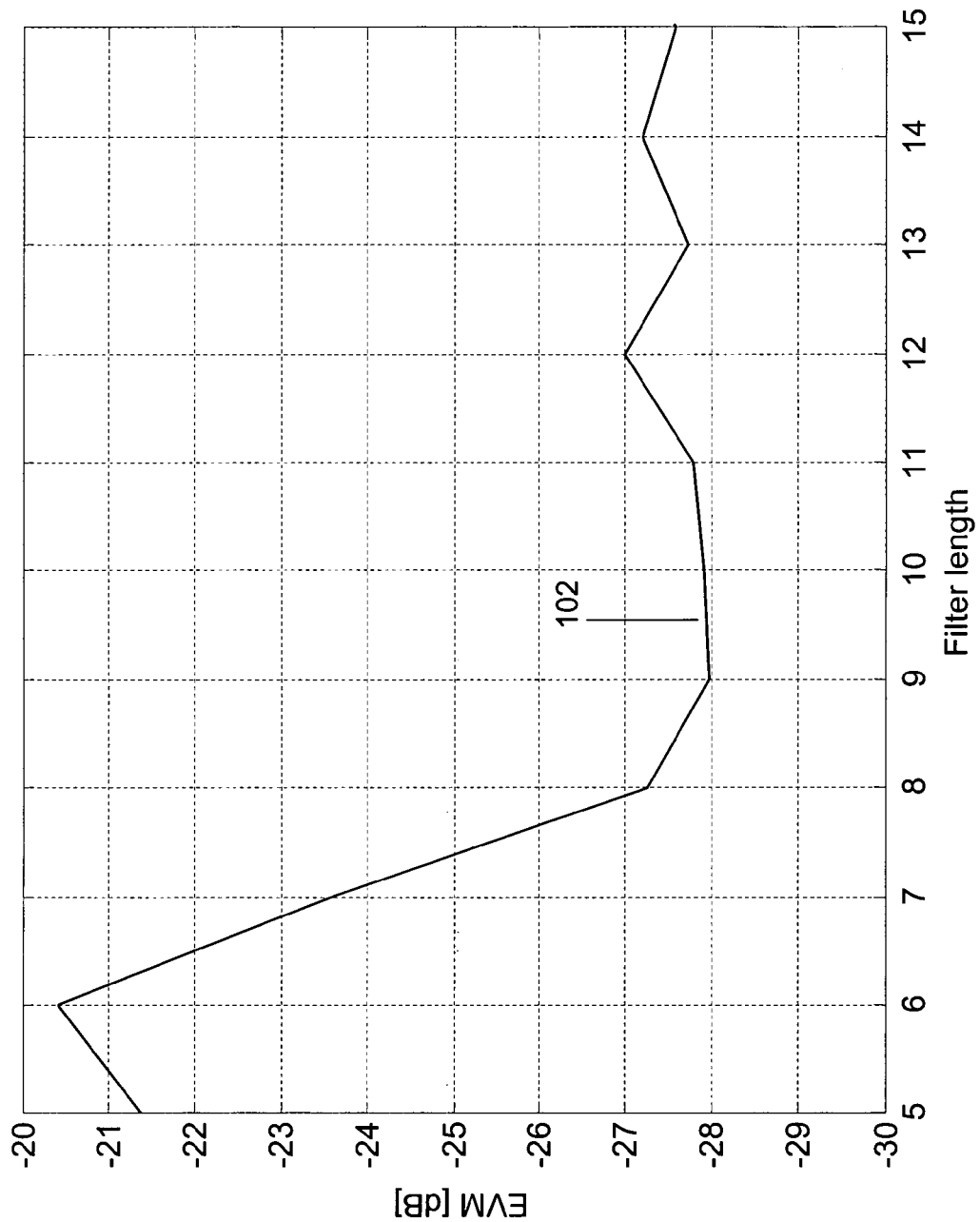
FIG. 10 is a graph illustrating a result from a simulation of an embodiment of the present invention.

For the above results, a filter length of 15 was used. The dependence on filter length for performance is presented in FIG. 10. However, the test bench was not complete regarding the included RX filters. Hence, the actual length may be larger than the results indicate.

Figure 11:
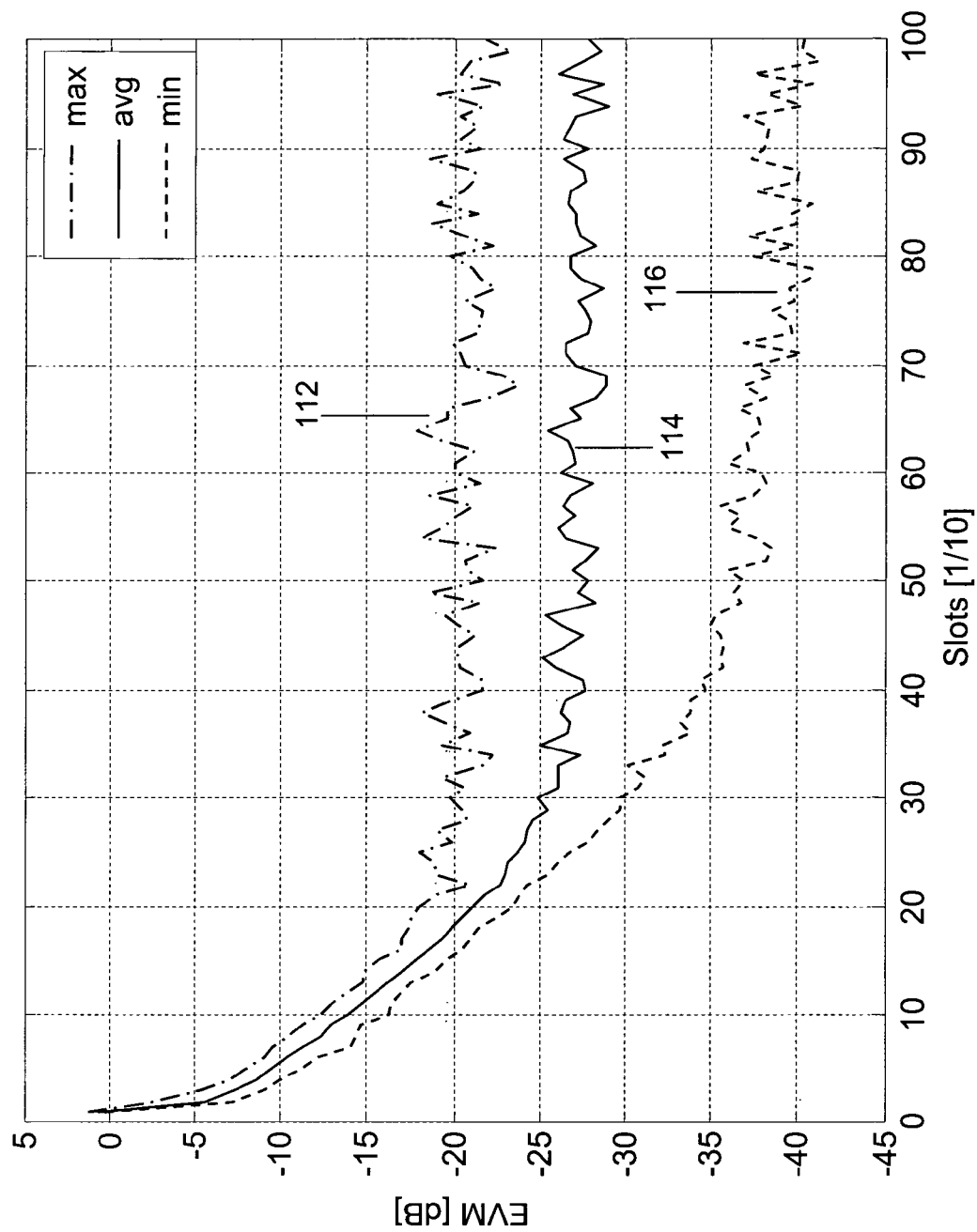
FIG. 11 is a graph illustrating results of a simulation of an embodiment of the present invention.

With regards to dynamic (i.e. a moving UE) performance, in WCDMA, for example, the TX gain may change by up to 1 dB per slot during normal operating conditions. Introducing a dynamic gain is likely to decrease performance to some extent. FIG. 11 presents performance when a dynamic gain changing randomly ±3 dB every half slot and also including that change in the cross-talk canceller in the transmitter i.e. changing the transmitter gain control and receiver gain control signals accordingly, such that the same gain changes are apparent in the canceller. From the Figure, it is evident that no discernible performance loss is found.

With respect to implementing of the above described embodiments, further comment can be made on several aspects thereof.

Firstly, with regards to the location of the cross-talk canceller in the receiver signal processing chain, the cross-talk canceller needs to be included prior to the automatic frequency controller (AFC) since afterwards the cross-talk signal is shifted in spectrum. Being a part of the DC offset compensator it is reasonable that it should be located adjacent to the DC blocker filter which is located as one of the first block in the RC receiver path. Which one comes first depends on the convergence speed of the two blocks in order to avoid one taking over the task of the other. The initialisation of the two blocks could be done by compensating for DC without the transmitter being active, and then initialising the transmitter and at the same time initialising the transmit cross-talk canceller.

Moreover, it should be noted that the cross-talk canceller of any of the embodiments may be implemented in either hardware or software, or as a combination of both. For example, path delay adaptation is likely to suffice with a SW implementation since it is rarely changed. Depending on the nature of any parasitic cross-talk coupling, the filter estimation part could be run more or less often. Convergence in the ideal case is fairly fast, after which little filter updates are needed in a stationary environment.

In order to design a combined HW/SW implementation a few parameters should be readable or read-writeable or controllable by SW. These could involve:
Adaptation factor, $\mu$,
Filter length, K,
Block length, M,
Path delay compensation, l,
TX and RX gain levels,
Adaptation enable
Filter Coefficients.

With respect to a fixed point implementation of the cross-talk canceller, a fixed point implementation is controlled by three factors:
i) RX dynamic range. For WCDMA embodiments the digital hardware RX data path is typically implemented with 12 bits; sign and 11 fractional bits. However, only 8 bits are typically required for HSDPA. Thus, the accuracy of the LMS adaptive filter output should at least be in level with HSDPA but no more than the RX data path itself.
ii) TX dynamic range after the RRC filter is typically 8 bits; sign and 7 fractional bits. This defines the TX canceller reference signal.
iii) TX range after the PA for which TX cancellation needs to be operative may be limited to e.g. 30 dB which translates into 5 bits. The minimum gain change is typically 0.5 dB this translates into a linear amplitude gain step of 1.06. In order to resolve a fraction $\leq 0.06$, the required number of bits is $|\log_2 0.06|=4.06$, i.e., 4 fractional bits are needed. This number defines the TX gain multiplier.

Various modifications may be made to the above described embodiments to provide further embodiments of the invention. For example, in the third and fourth embodiments, the cross-talk canceller comprises an amplifier which amplifies in accordance with the power amplifier and low noise amplifier gain control signals, a processing unit which squares the signal, a second amplifier which amplifies in accordance with the variable gain amplifier control signal, and then the filter. Whilst this ordering of the signal processing blocks applied to the transmit signal is beneficial to try and obtain a representation of the transmit cross-talk signal, because it reproduces the order of signal processing that is applied to the transmit signal as it works its way down the transmitter signal processing chain, and back up the receiver signal processing chain as cross-talk, in other embodiments this order of signal processing need not be used. For example, the amplifiers 47 and 48 may be placed in a different order, or at different locations in the signal processing chain. However, where this is done, the gain control signals may need to be adjusted, to make sure that the overall gain of the signal processing chain remains as previously. This illustrates another advantage of the arrangements of FIGS. 5 and 6, in that by performing the amplification, squaring, amplification, and filtering, in that order, simple copies of the transmitter and receiver gain control signals can be used to control the amplifiers 47 and 48.

As a further modification in the fourth embodiment, a least mean squares adaptive filter is used. However, this is not essential, and any adaptive filter may be used. For example, instead of using a least mean squares adaptive filter, a recursive least squares adaptation algorithm may be used for the filter.

Additionally, in other embodiments, the LMS or RLS filter may be replaced by any sort of "learning filter" by which we mean a learning element which is able to adapt its response dependent upon previous operations. For example, the filter may be replaced by a neural network. On start a known training sequence would be sent through the transmitter signal processing chain, which would then be incorporated into the receiver chain as transmitter cross-talk. This would allow such a neural network to undergo a training phase on the known training sequence, to learn how transmit signals are introduced into the receiver chain as both second order transmit cross-talk, and possibly also other parasitic cross-talk effects. After such a learning phase has been completed, the neural network can then process the transmit signal, to generate the local copy of the transmit cross-talk signal required in the cross-talk canceller, for cancellation from the receive signal.

Moreover, as a further modification, in the fifth embodiment, wherein higher order cross-talk is also cancelled we made use of a fixed transfer function filter. However, of course the filter may be an adaptive filter, such as a LMS or RLS filter, or, any other learning element, such as a neural network, as discussed above.

Additionally, in further embodiments, a cross-talk cancellation signal processing chain may be included for further higher orders, for example a sixth order, eighth order, or the like.

Further additions, modifications, or the like will be apparent to the intended reader, being a person skilled in the art, to provide further embodiments of the present invention, any and all of which are intended to be encompassed by the appended claims.

The invention claimed is:

1. A method of cross-talk cancellation in a transceiver having a transmitter which signal processes and transmits a transmit signal, and a receiver which receives and signal processes a receive signal, the receive signal including therein a transmit cross-talk signal being at least a partial representation of the transmit signal, the method comprising:

obtaining the transmit signal to be signal processed and transmit by the transmitter;

signal processing the transmit signal to produce a cross-talk cancellation signal, the signal processing comprising applying to the transmit signal one or more signal processing operations which emulate the generation of the transmit cross-talk signal from the transmit signal in the receiver, and amplifying the transmit signal by one or more gains applied to the receive signal by one or more corresponding amplifiers in the receiver; and combining, in the receiver, the cross-talk cancellation signal with the receive signal containing the transmit cross-talk signal to thereby substantially remove or reduce the transmit cross-talk signal from the receive signal.

2. A method according to claim 1, wherein the signal processing operation is a multiplication of the transmit signal with itself one or more times to produce a higher (second or more) order version of the transmit signal as said cross-talk cancellation signal.

3. A method according to claim 2, wherein a second signal processing operation comprises filtering the higher order version of the transmit signal with an estimate of the transmit cross-talk signal path transfer function to produce said cross-talk cancellation signal.

4. A method according to claim 3, wherein the estimate of the transmit cross-talk signal path transfer function substantially represents the signal processing applied to the transmit signal in the transmitter, and to the transmit cross-talk signal in the receiver, from the position in the transmitter signal processing chain from which the transmit signal is obtained to the position in the receiver signal processing chain at which the cross-talk cancellation signal is combined with the receive signal.

5. A method according to claim 4, wherein the estimate of the transmit cross-talk signal path transfer function disregards amplification and multiplication of the transmit signal and transmit cross-talk signal.

6. A method according to claim 4, wherein the estimate of the transmit cross-talk signal path transfer function is adaptive.

7. A method according to claim 6, wherein the adaptation of the estimate comprises: correlating the receive signal with the transmit cross-talk substantially removed therefrom with the transmit signal as input to a filter; and adapting a filter transfer function in dependence on the correlation result so as to reduce or remove any such correlation there between.

8. A method according to claim 1 wherein the signal processing operations further comprise amplifying the transmit signal by one or more gains applied to the transmit signal by any amplifier in the transmitter.

9. A method according to claim 8 wherein the transmit signal is:
  i) amplified by the product of a first gain as applied to the transmit signal in the transmitter and a second gain as applied to the transmit cross-talk signal prior to a receiver mixer in the receiver; and then
  ii) subject to self-multiplication to obtain a higher-order version thereof; and then
  iii) amplified by a third gain as applied to the transmit cross-talk signal in the receiver; and then
  iv) filtered according to an estimate of the transmit cross-talk signal path; whereby to obtain the cross-talk cancellation signal.

10. A method according to claim 1, wherein the cross-talk cancellation signal is subtracted from said receive signal as said combination therewith, to thereby substantially reduce or remove said transmit cross-talk signal therefrom.

11. A method according to claim 1, and further comprising delaying the transmit signal which is signal processed to obtain the cross-talk by an amount of time substantially corresponding to the processing delay due to the signal processing applied to the transmit signal in the transmitter, and to the transmit cross-talk signal in the receiver, from the position in the transmitter signal processing chain from which the transmit signal is obtained to the position in the receiver signal processing chain at which the cross-talk cancellation signal is combined with the receive signal.

12. A transceiver comprising:

a transmitter which signal processes and transmits a transmit signal; and a receiver which receives and signal processes a receive signal, the receive signal including therein a transmit cross-talk signal being at least a partial representation of the transmit signal; the transceiver further comprising:

a cross-talk canceller for substantially removing or reducing the transmit cross-talk signal from the receive signal, the cross-talk canceller comprising: an input for receiving the transmit signal to be signal processed and transmit by the transmitter; at least one signal processing element which signal processes the transmit signal received at the input to produce a cross-talk cancellation signal, the signal processing element being arranged to perform one or more signal processing operations which emulate the generation of the transmit cross-talk signal from the transmit signal, in the receiver, and wherein the signal processing element is further arranged to amplify the transmit signal by one or more gains applied to the receive signal by one or more corresponding amplifiers in the receiver; and a signal combiner, in the receiver, arranged to combine the cross-talk cancellation signal with the receive signal containing the transmit cross-talk signal to thereby substantially remove or reduce the transmit cross-talk signal from the receive signal.

13. A transceiver according to claim 12, wherein the signal processing element is a multiplier for multiplying the transmit signal with itself one or more times to produce a higher (second or more) order version of the transmit signal as said cross-talk cancellation signal.

14. A transceiver according to claim 13, further comprising a second signal processing element being a filter for filtering the higher order version of the transmit signal with an estimate of the transmit cross-talk signal path transfer function to produce said cross-talk cancellation signal.

15. A transceiver according to claim 14, wherein the estimate of the transmit cross-talk signal path transfer function is arranged so as to substantially represent the signal processing applied to the transmit signal in the transmitter, and to the transmit cross-talk signal in the receiver, from the position in the transmitter signal processing chain from which the transmit signal is obtained to the position in the receiver signal processing chain at which the cross-talk cancellation signal is, combined with the receive signal.

16. A transceiver according to claim 15, wherein the estimate of the transmit cross-talk signal path transfer function disregards amplification and multiplication of the transmit signal and transmit cross-talk signal.

17. A transceiver according to claim 15, wherein the filter is an adaptive filter.

18. A transceiver according to claim 17, wherein the filter further comprises: a correlator arranged to correlate the output of the signal combiner with the transmit signal as input to the filter; and a filter transfer function adaptation unit arranged to adapt the estimate in dependence on the correlation result so as to reduce or remove any such correlation therebetween.

19. A transceiver according to claim 13 wherein the cross-talk canceller further comprises one or more amplifiers arranged to amplify the transmit signal by one or more gains applied to the transmit signal by any amplifier in the transmitter.

20. A transceiver according to claim 19, wherein the cross-talk canceller comprises:
  i) a first amplifier arranged to amplify the transmit signal received at the input by the product of a first gain as applied to the transmit signal in the transmitter and a second gain as applied to the transmit cross-talk signal prior to a mixer in the receiver;
  ii) the multiplier arranged to self-multiply the amplified transmit signal to obtain a higher-order version thereof;
  iii) a second amplifier arranged to amplify the higher order version of the transmit signal by a third gain as applied to the transmit cross-talk signal in the receiver; and
  iv) the filter for filtering the amplified higher order version of the transmit signal according to an estimate of the transmit cross-talk signal path whereby to obtain the cross-talk cancellation signal.

21. A transceiver according to claim 12, wherein the signal combiner comprises a subtractor arranged to subtracted the cross-talk cancellation signal from said receive signal, to thereby substantially reduce or remove said transmit cross-talk signal therefrom.

22. A transceiver according to claim 12, and further comprising a path delay element arranged to delay the input transmit signal by an amount of time substantially corresponding to the processing delay due to the signal processing applied to the transmit signal in the transmitter, and to the transmit cross-talk signal in the receiver, from the position in the transmitter signal processing chain from which the transmit signal is obtained for input into the cross-talk canceller to the position in the receiver signal processing chain at which the cross-talk cancellation signal is combined with the receive signal.

23. A cross-talk canceller for cancelling a cross-talk signal in a receiver due to a transmitted signal transmit from a transmitter, the cross-talk canceller comprising an input which receives a copy of the baseband signal to be transmit, at least one amplifier which amplifies the copy of the baseband transmission signal in dependence on amplifier gain factors applied to the transmit signal in the transmitter and/or a received signal in the receiver, a multiplier to increase the order of the baseband transmit signal to at least the second order, an estimator which estimates the cross-talk signal path and filters the higher order transmit signal in accordance with the cross-talk path estimate to generate an estimated version of the cross-talk signal, and a subtractor, in the receiver, which subtracts the estimated version of the cross-talk from the signal being processed by the receiver to thereby cancel the cross-talk signal therefrom.

24. A method of cancelling a cross-talk signal in a receiver due to a transmitted signal transmit from a transmitter, comprising receiving a copy of a baseband signal to be transmit; amplifying the copy of the baseband transmission signal in dependence on amplifier gain factors applied to the transmit signal in the transmitter and/or a received signal in the receiver; increasing the order of the baseband transmit signal to at least the second order; estimating the cross-talk signal path and filtering the higher order transmit signal in accordance with the cross-talk path estimate to generate an estimated version of the cross-talk signal, and subtracting, in the receiver, the estimated version of the cross-talk from the received signal being processed by the receiver to thereby cancel the cross-talk signal therefrom.

* * * * *

UNITED STATES PATENT AND TRADEMARK OFFICE
CERTIFICATE OF CORRECTION

PATENT NO. : 8,902,724 B2  
APPLICATION NO. : 12/863138  
DATED : December 2, 2014  
INVENTOR(S) : Åström Page 1 of 1

It is certified that error appears in the above-identified patent and that said Letters Patent is hereby corrected as shown below:

In the Specification

In Column 3, Line 1, delete "$Y(f)=(X_{RX}(f)+X_{TX}(f)(X_{LO}(f))=X_{RX}(f)X_{LO}(f)+X_{RX}(f)X_{TX}(f)X_{LO}(f)+X_{TX}^2(f)$" and insert -- $Y(f)=(X_{RX}(f)+X_{TX}(f))(X_{LO}(f)+X_{TX}(f))=X_{RX}(f)X_{LO}(f)+X_{RX}(f)X_{TX}(f)+X_{TX}(f)X_{LO}(f)+X_{TX}^2(f)$ --, therefor.

In Column 5, Line 41, delete "DESCRIPTION" and insert -- DETAILED DESCRIPTION --, therefor.

In Column 7, Lines 16-17, delete "down-sampler 20." and insert -- down-sampler 28. --, therefor.

In Column 7, Line 37, delete "has, been" and insert -- has been --, therefor.

In Column 12, Line 50, delete "individual," and insert -- individual --, therefor.

In the Claims

In Column 19, Line 6, in Claim 15, delete "is, combined" and insert -- is combined --, therefor.

Signed and Sealed this  
Eleventh Day of August, 2015

Michelle K. Lee  
*Director of the United States Patent and Trademark Office*